US006278876B1

(12) United States Patent
Joshi et al.

(10) Patent No.: US 6,278,876 B1
(45) Date of Patent: *Aug. 21, 2001

(54) SYSTEM AND METHOD FOR IMPLEMENTING TERMINAL TO TERMINAL CONNECTIONS VIA A GEOSYNCHRONOUS EARTH ORBIT SATELLITE

(75) Inventors: Chandra Joshi, Gaithersburg, MD (US); Anthony Noerpel, Lovettsville, VA (US); Neeraj Tewari, North Potomac, MD (US); Gerard Stelzer, Frederick, MD (US); David Roos, Boyds, MD (US); Chi-Jiun Su, Derwood, MD (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,098

(22) Filed: Jul. 13, 1998

Related U.S. Application Data

(60) Provisional application No. 60/052,443, filed on Jul. 14, 1997.

(51) Int. Cl.[7] .................................................. H04Q 7/20
(52) U.S. Cl. ..................... 455/427; 455/422; 455/428; 455/430; 455/435; 455/440
(58) Field of Search ....................... 455/12.1, 13.1, 455/13.2, 13.3, 427, 428, 430, 422, 429, 432, 433, 434, 435, 436, 440, 445, 456

(56) References Cited

U.S. PATENT DOCUMENTS

| 5,689,568 | * | 11/1997 | Laborde | 455/12.1 |
| 5,765,098 | * | 6/1998 | Bella | 455/13.3 |
| 5,781,540 | * | 7/1998 | Malcolm et al. | 455/12.1 |
| 5,790,939 | * | 8/1998 | Malcolm et al. | 455/12.1 |
| 5,812,545 | * | 9/1998 | Liebowitz | 370/337 |

* cited by examiner

Primary Examiner—Daniel Hunter
Assistant Examiner—Yemane Woldetatios
(74) Attorney, Agent, or Firm—John T. Whelan; Michael W. Sales

(57) ABSTRACT

A system and method for implementing single hop space segment terminal to terminal connections. The system includes a satellite-based radio frequency (RF) communication link for conveying multiple communication channels over the space segment via one or more spot beams. A terrestrial supervisory transceiver such as a gateway station is provided in communication with the satellite-based communication link. Mobile hand-held terminals (HHTs), herein first and second access terminals, may be located within one or more of the spot beams to communicate with one another via a single hop connection through a satellite of the system. A switch is provided for communication switching with the satellite of the system for the multiple communication channels to couple the first access terminal and the second access terminal over the space segment via one or more of the spot beams. The terrestrial supervisory transceiver or gateway is provided in communication with the satellite switch via the satellite-based communication link for implementing the single hop space segment terminal to terminal connection.

20 Claims, 9 Drawing Sheets

CHANNEL ASSIGNMENT PROCEDURE (ORIGINATING SIDE)

CHANNEL ASSIGNMENT PROCEDURE (TERMINATING SIDE)

MM CONNECTION ESTABLISHMENT (ON TERMINATING SIDE)

FIG. 9 — TtT CALL (L-L SWITCHOVER AFTER CONNECT)

AT/NETWORK SETUP FOR TtT CALL (DOUBLE-HOP)

ASSIGNMENT PROCEDURE

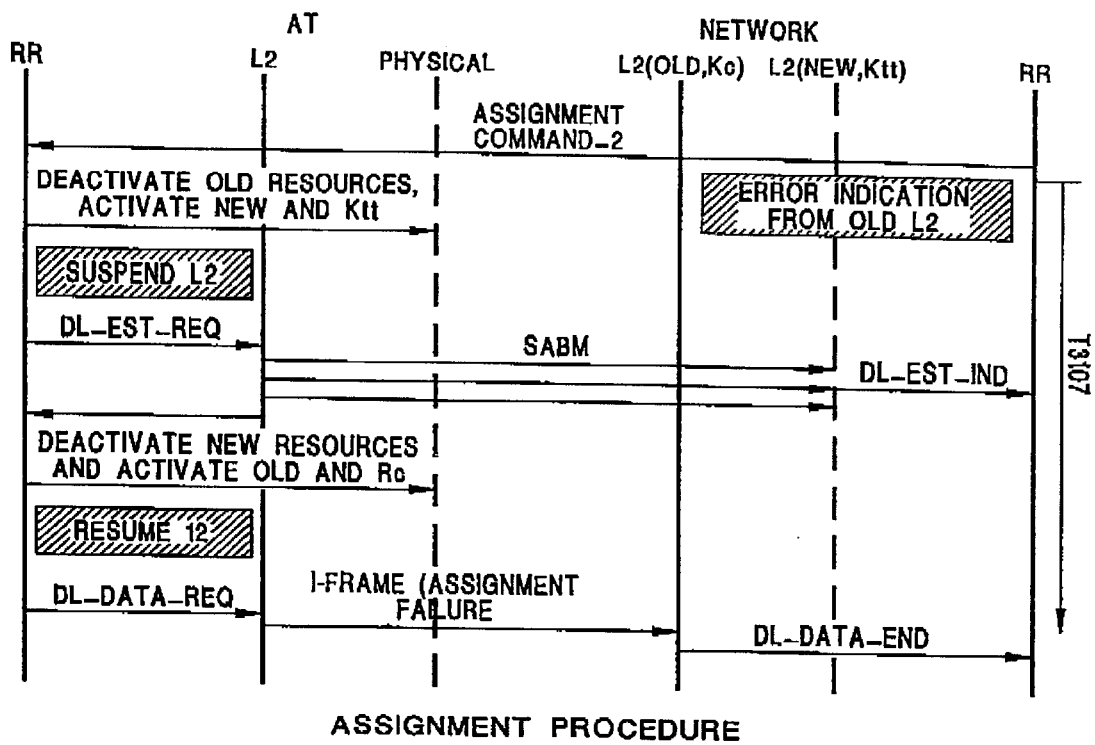
FIG. 12 ASSIGNMENT PROCEDURE
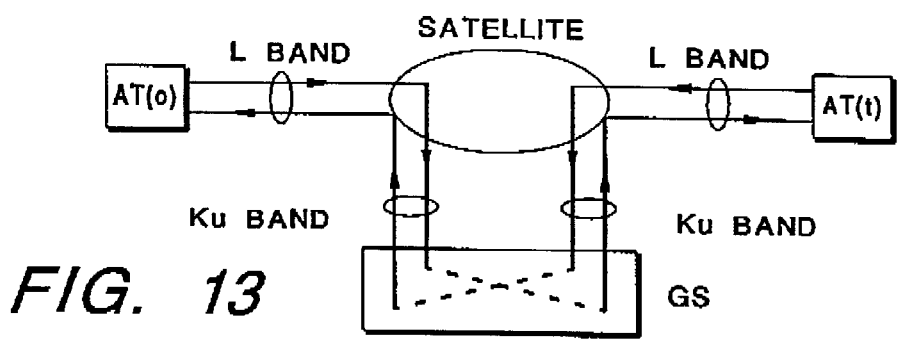
FIG. 13
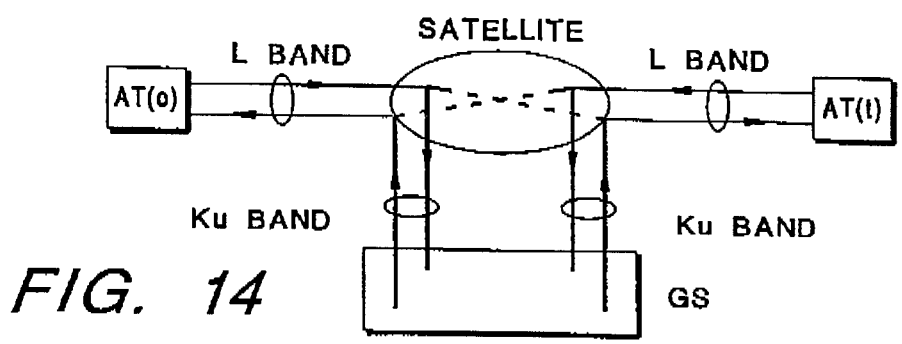
FIG. 14

POWER CONTROL DURING TtT CALL

SYSTEM AND METHOD FOR IMPLEMENTING TERMINAL TO TERMINAL CONNECTIONS VIA A GEOSYNCHRONOUS EARTH ORBIT SATELLITE

This application claims priority to U.S. Provisional patent application Ser. No. 60/052,443, filed Jul. 14, 1997, incorporated herein by reference.

This patent document relates to a common air interface described in a series of patent documents filed concurrently herewith. Related patent documents are: U.S. patent application Ser. No. 09/115,102, filed Jul. 13, 1998, of Soleimani, et al.; for SIGNALING MAINTENANCE FOR DISCONTINUOUS INFORMATION COMMUNICATIONS;

U.S. patent application Ser. No. 09/115,097, filed Jul. 13, 1998, of Roos, et al.; for MOBILE SATELLITE SYSTEM HAVING AN IMPROVED SIGNALING CHANNEL;

U.S. patent application Ser. No. 09/115,096, filed Jul. 13, 1998, of Noerpel, et al.; for SPOT BEAM SELECTION IN A MOBILE SATELLITE COMMUNICATION SYSTEM, now U.S. Pat. No. 6,233,451;

U.S. patent application Ser. No. 09/115,101, filed Jul. 13, 1998, of Noerpel, et al.; for PAGING RECEPTION ASSURANCE IN A MULTIPLY REGISTERED WIRELESS TRANSCEIVER;

U.S. patent application Ser. No. 09/115,095, filed Jul. 13, 1998, of Joshi, et al.; for IMMEDIATE CHANNEL ASSIGNMENT IN A WIRELESS SYSTEM;

U.S. patent application Ser. No. 09/115,099, filed Jul. 13, 1998, of Joshi, et al.; for ERROR AND FLOW CONTROL IN A SATELLITE COMMUNICATIONS SYSTEM; and U.S. patent application Ser. No. 09/115,100, filed Jul. 13, 1998, of Roos, et al.; for SYNCHRONIZATION OF A MOBILE SATELLITE SYSTEM WITH SATELLITE SWITCHING, all of which are incorporated herein by reference.

BACKGROUND OF THE INVENTION

The present invention relates to cellular and satellite communications. More particularly, the invention relates to a method and a system for implementing terminal to terminal connections via a geosynchronous earth orbit satellite in a satellite communication network.

Background and Description of Related Art

A mobile satellite communication system such as the Geosynchronous Earth Orbit Mobile (GEM) network discussed herein, typically includes one or more satellites, at least one fixed ground terminal such as a gateway system (GS) and several mobile access terminals (ATs). The access terminals typically communicate with the public switched telephone network (PSTN) or other mobile terminals via an air communication interface between the satellite and the gateway. Using the mobile access terminals, the satellite system provides a variety of telephony services. Satellite telephony systems as described herein share call processing information with terrestrial systems such as the GSM cellular system to allow compatibility between the satellite, cellular, and the public switch telephone network services. The terrestrial standards such as GSM may not apply directly to the mobile satellite communication system, more particularly the satellite air interface poses physical constraints not accounted for in the GSM architecture.

A number of communication systems utilizing satellites and small mobile terminals provide voice and other information communication. In such systems, the single-hop one way propagation delay is about 270 ms. This is about at the limit of acceptability for most users. If a call is established between two such users with two satellite hops, the one way delay becomes approximately 540 ms, which is generally unacceptable. In order to reduce this propagation delay when two mobile users are conversing, it would be desirable to provide a link made to establish a connection through the satellite, such that the connection involves only a single satellite hop.

Thus, there exists a need for a method and a system for performing satellite switched communications to enable the GEM network to establish a single hop satellite link between two user access terminals.

SUMMARY OF THE INVENTION

Accordingly, the present invention addresses a scheme for the establishment of single-hop terminal to terminal (TtT) call in the GEM network with the assignment of the terminal to terminal channel (TTCH) to allow the network and AT to have a reliable communication link via the satellite.

Briefly summarized, the present invention relates a system and method for implementing single hop space segment terminal to terminal connections. The system includes a satellite-based radio frequency (RF) communication link for conveying multiple communication channels over the space segment via one or more spot beams. A terrestrial supervisory transceiver such as a gateway station is provided in communication with the satellite-based communication link. Mobile hand-held terminals (HHTs), herein first and second access terminals, may be located within one or more of the spot beams to communicate with one another via a single hop connection through a satellite of the system. A switch is provided for communication switching with the satellite of the system for the multiple communication channels to couple the first access terminal and the second access terminal over the space segment via one or more of the spot beams. The terrestrial supervisory transceiver or gateway is provided in communication with the satellite switch via the satellite-based communication link for implementing the single hop space segment terminal to terminal connection.

It will be understood that both the foregoing and general description in the following detailed description are exemplary and intended to provide further explanation of the invention as claimed. The accompanying drawings provide an understanding of the invention as described in the preferred embodiments to illustrate the invention and serve to explain the principles of the invention.

BRIEF DESCRIPTION OF THE DRAWINGS

FIG. 3 shows the relationship between the Tx, Rx frames of the satellite and AT;

FIG. 12 shows the channel assignment procedure under abnormal cases;

FIGS. 13 and 14 show the configuration of the AT's and GS engaged in a TtT double hop call.

DETAILED DESCRIPTION OF THE PREFERRED EMBODIMENTS

Figure 1:
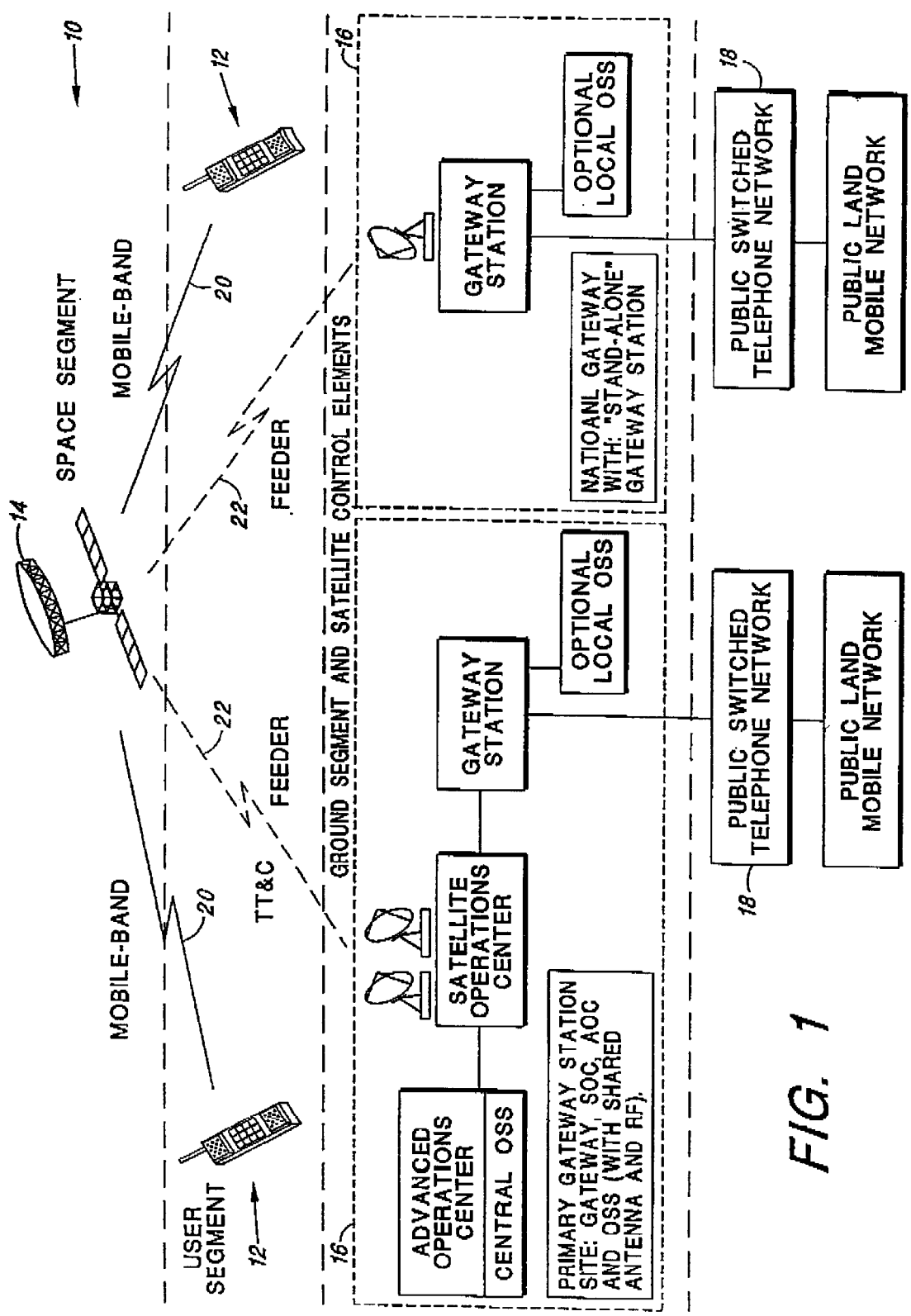
FIG. 1 is a schematic block diagram of a mobile satellite communication system in accordance with the present invention.

Referring to the drawings and particularly to FIG. 1 is a preferred embodiment of a mobile satellite communication system 10 is illustrated. The mobile communication-system 10, herein a Geosynchronous Earth Orbit Mobile satellite system (GEM) includes several mobile access terminals 12 and one or more satellites 14. One or more gateway stations 16 (GS) are coupled to public switch telephone networks 18 (PSTN). The access terminal 12 is typically a hand-held telephone or vehicle-mounted telephone, but, as described in the present embodiment, the access terminal 12 may provide operation both as a GEM access terminal and as an GSM cellular telephone. While being used with the satellite communication systems described herein, the access terminal 12 communicates over an L-band frequency with a particular spot beam 20 with the satellite 14. Each spot beam 20 is associated with a predetermined geographic region. The terrestrial gateway 16 communicates with the satellite 14 over a Ku-band frequency. As illustrated in FIG. 1, a plurality of gateways 16 may be employed, each providing similar functions and being employed to access, for example, respective public switched telephone networks 18.

The satellite 14 includes transponders for translating between the L-band spot beam 20 signals used by the access terminals 12 and the Ku-band 22 signals used by the gateway 16. The gateway 16 interfaces with the terrestrial telephony carrier, such as PSTN 24, and may also interface with a conventional cellular network such as GSM. Accordingly, users may place telephone calls using the access terminal 12 to either land line or cellular telephone users.

The satellite 14 provides L-band-to-L-band bent pipe single hop communications, as well as satellite switched communications to support communications between the users of the access terminals 12. At satellite 14, the L-band 20 uplink and downlink are transmitted via multiple L-band spot beams 20. Subscribers to the system 10 have unique telephone numbers allowing them to receive telephone calls when they are registered to receive pages from either the GEM or the GSM cellular network. Registration is automatic when the access terminal 12 is turned on, such that a registration procedure locates the access terminal 12 within a particular spot beam coverage area. In addition to originating calls, the access terminals 12 can receive calls from any terrestrial facility by connecting the call through the gateway station 16, at which the gateway 16 determines the location of the access terminal 12 and sends a paging message to the access terminal 12 to announce the incoming call.

The system 10 uses a low rate encoded or ciphered voice transmission. In the described embodiments, the access terminals 12 are provided with dual mode operation allowing for voice communications either via satellite or via the local cellular system, e.g., GEM and GSM as discussed herein.

The gateway 16 provides for user mobility as users travel with the access terminal 12 from spot beam to spot beam. Additionally, the communication channels carried via the satellite 14 provide space segment resources used for control functions, i.e., one or more channels in each L-band spot beam 20 are control channels, e.g., the gateway 16 may place a forward control signal in each L-band spot beam 20 to allow synchronization of the access terminals 12 and to carry network control information from the gateway 16 to the access terminals 12. The forward control channels allow the access terminals 12 to acquire a satellite carrier and identify the L-band spot beam 20 and gateway station 16 which originates the signal. The gateway 16 uses the forward control channel to page access terminals 12 using unique addresses to announce mobile terminated calls. Each L-band spot beam 20 preferably contains a return direction signaling channel that access terminals 12 use to initiate and register calls with the gateway 16. During a call, in-band low data rate control channels are preferably available between the access terminals 12 and the gateway 16 for call supervision, power control, and to initiate call termination. For example, during burst communication between the access terminal 12 and the satellite 14, a threshold signal may be established relating to the strength of the transmitted burst for setting a power control bit based on a comparison of received signal strength with threshold values. In addition to such information being transmitted during active voice communications, certain information must also be transmitted during voice inactivity by keep-alive bursts (KABs) which can be categorized as one of two types, namely, explicit digital information, and implicit information in the waveforms transmitted.

Explicit digital information provided by the keep-alive bursts include a description of the background sounds present that the transmitter's microphone, and commands and status messages associated with power control. Information implicit in the waveforms transmitted include the power level of the signal, the signal quality as perceived by the receiver, and information used in tracking both carrier frequency offset and symbol timing error for synchronization between the transmitter and receiver.

The system 10 contains considerable operational flexibility both from the standpoint of network features and mobile terminal capabilities. The gateway 16 is a conventional gateway as understood in the art, which includes a mobile switching center (MSC), base station controllers (BSCs), base transceiver stations (BTS), and radio frequency units. As is understood by those skilled in the art, the MSC allows communications with the public switch telephone network or other mobile switching centers. The MSC is connected preferably with an A-interface such as a standard E1 or E3 line with the BSC. The BSC is then connected through a communications channel such as a T1 line to one or more BTSs which may communicate via radio frequency (RF) communications to the access terminal 12. Telephony communications may be originated with the access terminal 12 by transmitting initialization data to the satellite 14 of the space segment over a control channel which then communicates down to the gateway 16. The control channel is transmitted over a time slot within a frequency assigned to the spot beam 20 having a coverage area surrounding the access terminal 12. At the gateway 16, the call is transmitted via a radio frequency channel to the BTS assigned to the spot beam 20 servicing the access terminal 12. From the BTS the call is routed to the BSC and then to the MSC, from which the call is routed to either the PSTN or another MSC. Thereafter, a communications channel is established through the entire gateway 16 and a subscriber using the access terminal 12 may communicate over the established communications channel. Calls may also originate from either the PSTN or a GSM cellular network by entering the gateway 16 at the MSC which routes information to the BSC for paging the access terminal 12 via the appropriate BTS. After the access terminal 12 responds to the page from the BTS, a communications channel is then established.

Figure 2:
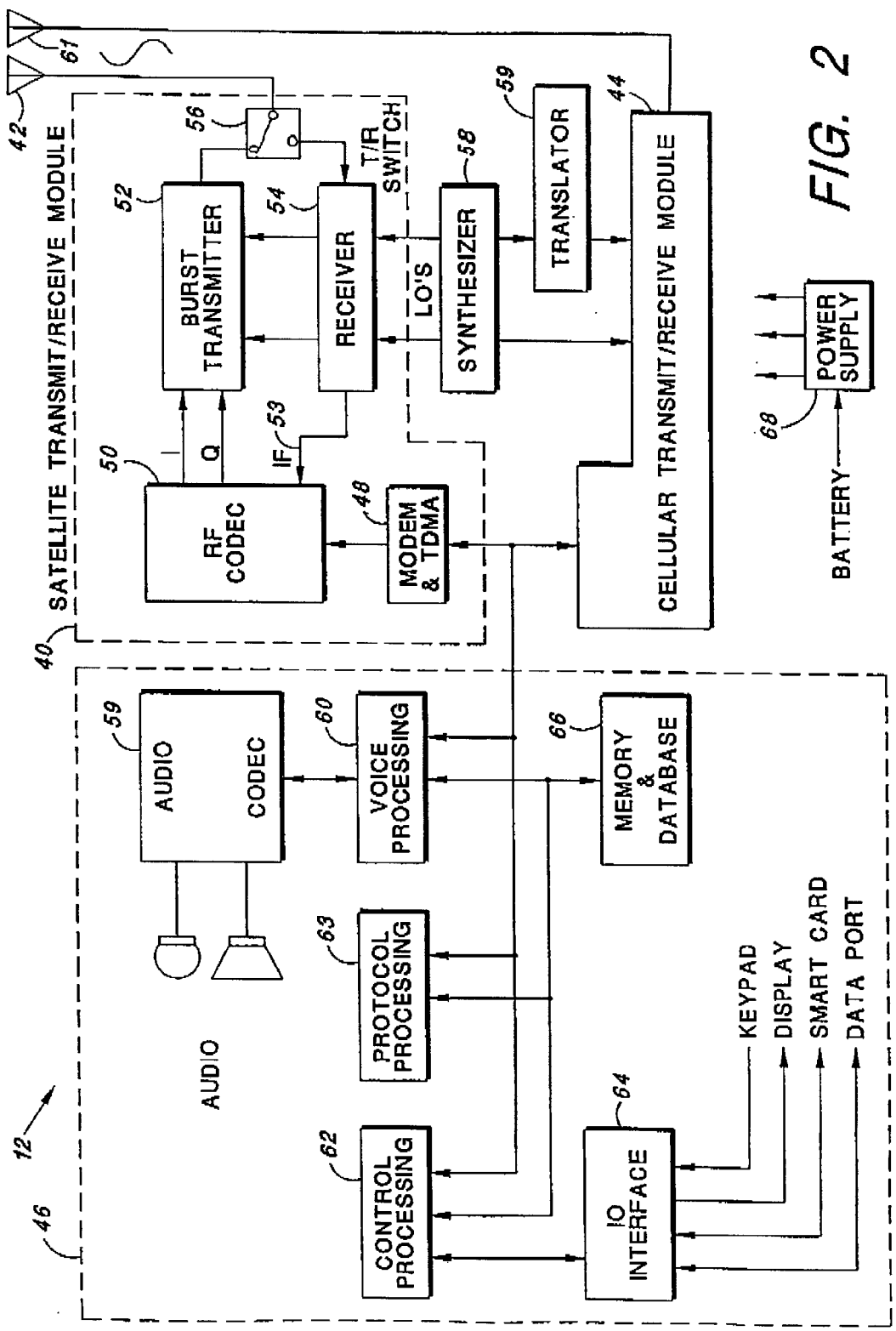
FIG. 2 is a block diagram of a preferred embodiment of a mobile access terminal for use in the mobile satellite communication system of FIG. 1.

The access terminal 12 as shown in FIG. 2 includes a satellite module 40, a satellite antenna 42, a cellular module 44, and a user interface module 46. The satellite module 40 is coupled to the user interface module 46, the cellular module 44, and the satellite antenna 42. Preferably, the satellite antenna 42 is a physically small antenna, such as a helix type antenna. The satellite module 40 includes a modem and TDMA unit 48, an RF coder and decoder (codec) 50, a burst transmitter 52, a receiver 54, and a transmit or receive (T/R) switch 56. In the preferred embodiment, the modem 48 is connected to the RF codec 50, and the RF codec 50 is connected to the burst transmitter 52 and to the receiver 54. The T/R switch 56 is connected to the burst transmitter 52, the receiver 54, and the satellite antenna 42.

Within the satellite module 40, the modem 48 converts speech or data samples to and from channel symbols using quadrature phase shift key modulation (QPSK). QPSK is preferably performed digitally by an application-specific integrated circuit or alternatively on a commercial available digital signal processor. The RF codec 50 converts channel symbols from the modem 48 into baseband I and Q signals that are transmitted to the burst transmitter 52. In the receive direction, the RF codec 50 processes an IF signal 53 from the receiver 54 for input to the modem 48.

The burst transmitter 52 converts the I and Q signals from the RF codec 50 up to a desired frequency, preferably an L-band frequency, for transmission by the first antenna 42. The receiver 54 converts a received L-band signal from the first antenna 42 into the IF signal 53 sent to the RF codec 50.

The T/R switch 56 allows the access terminal 12 to either transmit data or receive data. The access terminal 12 also includes a synthesizer 58 that provides a fixed local oscillator (LO) signal for the RF codec 50. The synthesizer 58 includes a variable local oscillator for channel tuning within the satellite module 40 and generates data clock signals for the modem 48. Both the fixed local oscillator and the variable local oscillator within the synthesizer 58 may be adjusted based on commands from either the gateway 16 or from another access terminal 12. In the preferred embodiment, the synthesizer 58 is connected to the receiver 54 and to the cellular module 44.

The user interface module 46 includes an audio and codec unit 59, a voice processing unit 60, a controller 62, an input/output (I/O) interface 64, and a memory 66. Preferably, each element within the user interface module 46 communicates with the other user interface elements. The voice processing unit 60 includes a voice transcoder that performs source coding to compress the digital 64 Kb/s PCM signal. Specifically, an encoder running on a programmable digital signal processor, such as a low delay CELP encoder, compresses the 64 Kb/s PCM signal into approximately a 3.6 Kb/s encoded signal. Alternatively, the encoder may be a multibased excited (MBE) type 3.6 Kb/s encoder that is well known-to those skilled in the art.

The controller 62 preferably provides a multitasking firmware environment for monitoring and controlling the mobile terminal hardware. The controller 62 may occupy the same processor as the voice transcoder or may optionally be disposed on a separate processor. Preferably, the controller 62 includes an I/O interface 64 that provides a communication interface with a user. The I/O interface 64 includes a keypad for data entry such as a phone number, a display, a data port for digital communication such as a facsimile transmission, and a smart card interface as specified for GSM.

The cellular module 44 allows the access terminal 12 to communicate with a cellular system over a second antenna 61. The second antenna is a linearly polarized whip meeting cellular system standards and the cellular module 44 uses standard components, such as a GSM chip set, known to those skilled in the art. Preferably, the access terminal 12 operates in a first mode where the access terminal 12 functions as a conventional cellular phone. In a second mode, the access terminal 12 preferably operates so that the access terminal 12 communicates with the satellite 14. A battery 68 is provided for portable operation of the access terminal 12.

The preferred access terminal 12 has many advantages. For example, the access terminal 12 provides dual-mode operation, either cellular or satellite. Also, the access terminal 12 is mobile and provides high quality digital voice. Further, the access terminal 12 allows for paging and messaging, transmission at a 2400 or 4800 bps data rate via the data port, and provides a convenient cellular-like interface. Also, the access terminal 12 may transmit on a single channel using a single time slot within a carrier signal allowing many other user terminals or access terminals 12 to transmit over the same carrier. Thus, the access terminal 12 efficiently transmits over L-band spot beam 20 frequency resources.

The following description relates to the requirements to establish a terminal to terminal (TtT) connection between two user terminals in a GEM satellite system via a single hop, both ATs (source and destination) must be registered in the same gateway station. The network must provide a common ciphering key for the privacy of the call, the frame number adjustment to compensate for any extra delay introduced by the satellite time slot switch and the configuration of the user terminals with regard to encryption as one of the terminals must now behave as the network. Furthermore, an additional signaling connection must be established between each AT and the network gateway to maintain network control over the phone call.

In order to establish a TtT call between two APMT subscribers via a single satellite hop, both AT's (source and destination) shall be registered at the same GS (i.e., the same MSC). If the destination AT is registered elsewhere than the source AT at the time of call origination, the source AT shall be "re-registered" to the GS of the destination AT.

The network shall provide a common ciphering Key (Ktt) for the privacy of the call, the frame number adjustments for the delay introduced by the satellite during L—L switch over, and configuration (AT or NETWORK) of the AT and the CU of the network for the use of the ciphering sequence numbers (S1, S2) to cipher and decipher the message.

The network shall be able to cross connect assigned L—L channels at the satellite. On L—L switch over, network shall be able to perform the signaling (TTCH), power control, and timing correction and interception of the call.

The GEM satellite system is a multiple-beam, multicarrier, synchronous system where the clock and frame on board the satellite serves as the timing reference to synchronize the TDMA transmission of the ATs and the network. All forward and return carriers in all spot beams are frame, slot, and symbol synchronous at the internal satellite switching point.

To compensate for different delays (propagation and processing) between spot beams and within spot beams at the extremes of the coverage area, the forward and return frames are offset relative to each other at the AT. To accurately maintain the correct time alignment at the satellite, the AT advances or retards the transmission of bursts relative to the reception of bursts to synchronize their arrival at the internal reference point in the satellite.

Figure 3:
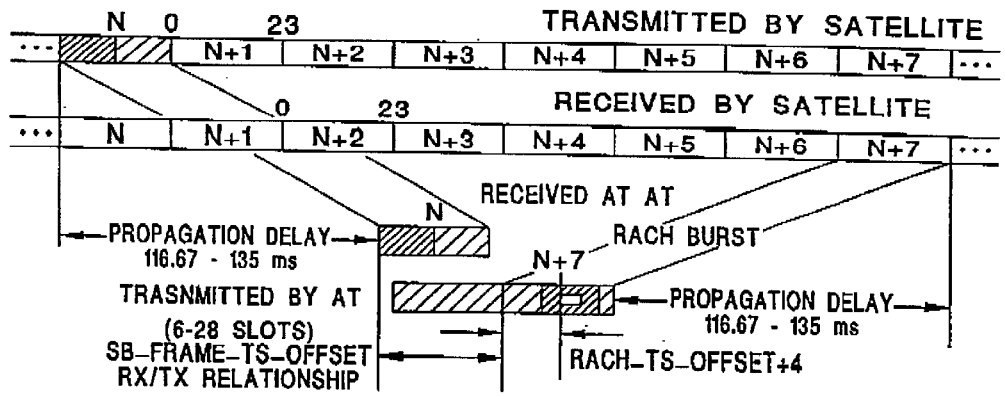

The deals of the AT's synchronization processes are described in the following steps. FIG. 3 shows the relationship of Rx frame clock and Tx frame clock on completion of the synchronization process. At start-up, the AT initializes its Rx frame start clock to receipt of the BCCH bursts. The AT reads the SI message and uses the parameters SB_FRAME_TS_OFFSET and SB_SYMBOL_OFFSET to align the Tx frame clock. The parameter SB_FRAME_TS_OFFSET indicates to the AT the offset between the forward link time slot 0 in frame number N (Fn=N) and the return link time slot 0 in frame number N+7 (Fn=N+7) nominally at the center of the spot beam within an accuracy of a time slot. The parameter SB_SYMBOL_OFFSET indicates to the AT additional offset in symbol periods nominally at the center of the spot beam.

The sum of these two parameters (k=SB_FRAME_TS_OFFSET*39+SB_SYMBOL_OFFSET) gives the timing correction for the Tx clock within a symbol time at the center of the spot beam. On applying this correction to the Tx frame clock, the Rx and Tx clocks of the AT are adjusted to the center of the spot beam. Since the AT is at some unknown location within a spot beam, the accuracy of the relative timing between the Rx and the Tx clocks is now adequate so that a CHANNEL REQUEST message if transmitted by the AT will fall within the 12 slot RACH window.

When the AT launches a CHANNEL REQUEST message in the RACH, the AT calculates the desired TS, j (j=RACH_TS_OFFSET+4) to start the transmission of the burst on the return link. The network processes the CHANNEL REQUEST message and assigns a channel and computes an appropriate timing correction to within a $\frac{1}{16}$ of symbol. The AT on receipt of the IMMEDIATE ASSIGNMENT applies the timing correction to the Tx clock. At this point, Rx and Tx clocks are separated by a well-defined offset, and AT is known to be in synchronization with the network. FIG. 3 shows the relationship between the Tx, Rx frames of the satellite and AT. The GS will perform a similar operation to adjust its Tx and Rx frame numbers and clocks.

Figure 4:
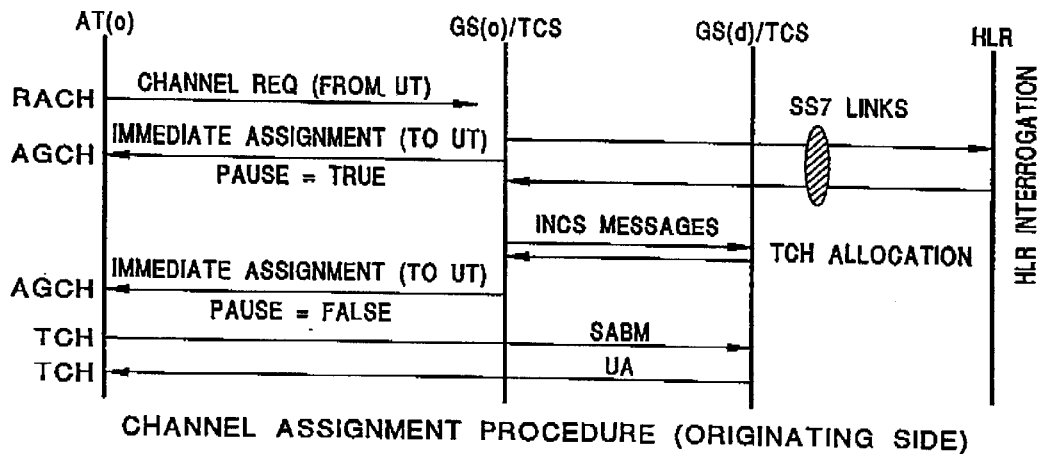
FIG. 4 shows the Channel Assignment procedure during a TtT call.

The AT(o) sends a CHANNEL REQUEST in the RACH channel and waits for the IMMEDIATE ASSIGNMENT on the AGCH of the corresponding CCCH. The TCS on receipt of the CHANNEL REQUEST performs the following functions and allocates the channel to the AT(o). FIG. 4 shows the Channel Assignment procedure during a TtT call.

On receipt of the CHANNEL REQUEST message, the TCS determines whether the called party number is an APMT number or not by analyzing the received called party number. If it is so, the TCS sends an IMMEDIATE ASSIGNMENT with a PAUSE indication to the AT(o). The AT(o) then waits for the assignment of channel in a received IMMEDIATE ASSIGNMENT message. The TCS(o) interrogates the called party HLR to determine the current location of called AT(d), i.e., the MSC_ID of the AT(d). The TCS(o) validates the Radio Resource restriction and roaming agreement between the AT(o) and the Service Provider of the selected gateway. If there are no restrictions, the TCS(o) allocates the traffic channel, assigns an AT_ID, identifies it as a TtT call, and transfers this information to the selected gateway TCS(d) via INCS.

The TCS(d) treats the assigned resources as its own, activates it, and acknowledges to the originating TCS(o). The TCS(o) on receipt of the acknowledgement of the transferred resources, computes, timing, frequency, and power correction for the AT(o) and assigns the allocated traffic channel (as described above) to the AT(o) by sending the IMMEDIATE ASSIGNMENT (PAUSE=False) on the corresponding CCCH with an indication to initiate Location Update/CM Service procedure with TMSI/IMSI as AT identity.

The AT(o) on receipt of the IMMEDIATE ASSIGNMENT (PAUSE=False) initiates a link establishment procedure on the assigned (TCH) channel. In this procedure, the AT(o) sends an SABM and the GS(d) sends an UA in response to the SABM message. On successful completion of the Link establishment, the RR connection is known to be established between the AT(o) and the GS(d).

Figure 5:
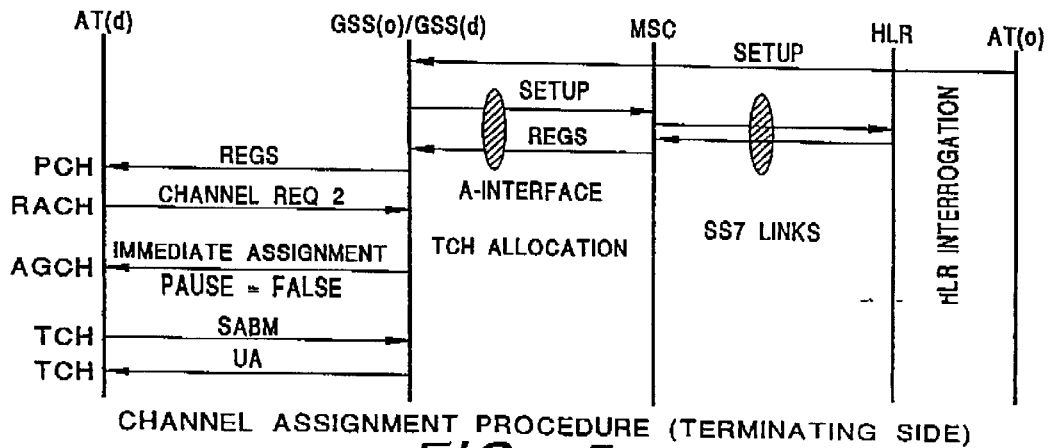
FIG. 5 shows the RR establishment procedure on the AT terminating side.

FIG. 5 shows the RR establishment procedure on the AT terminating side. On getting a Page Request from the MSC, the GSS(d) will determine CCCH id, and page group id, and transmits the page message over the air on the selected CCCH. The terminating AT listening to the page in the CCCH will respond to the page by initiating a CHANNEL REQUEST procedure on the RACH and echo the received MSC_ID, Mobile identity (TMSI/IMSI) in the CHANNEL REQUEST2 message. The AT sends a CHANNEL REQUEST2 message in the RACH channel and waits for the IMMEDIATE ASSIGNMENT on the AGCH of the corresponding CCCH.

The RR Connection Setup is exactly like the case as in originating AT with the following differences. The GSS(d) will not perform the HLR interrogation. It will select the gateway based on the value of MSC_ID received with the CHANNEL REQUEST2. The first layer 3 message will be Page Response with mobile identity (IMSI/TMSI) as indicated by the network in the IMMEDIATE ASSIGNMENT message, instead of Location Update Request.

The process requires that the MSC shall not release the SCCP connection at the end of the location update. The MSC will be informed of this condition via the "Follow-on Request Pending" information element in the LOCATION UPDATING REQUEST message received from the UT.

Figure 6:
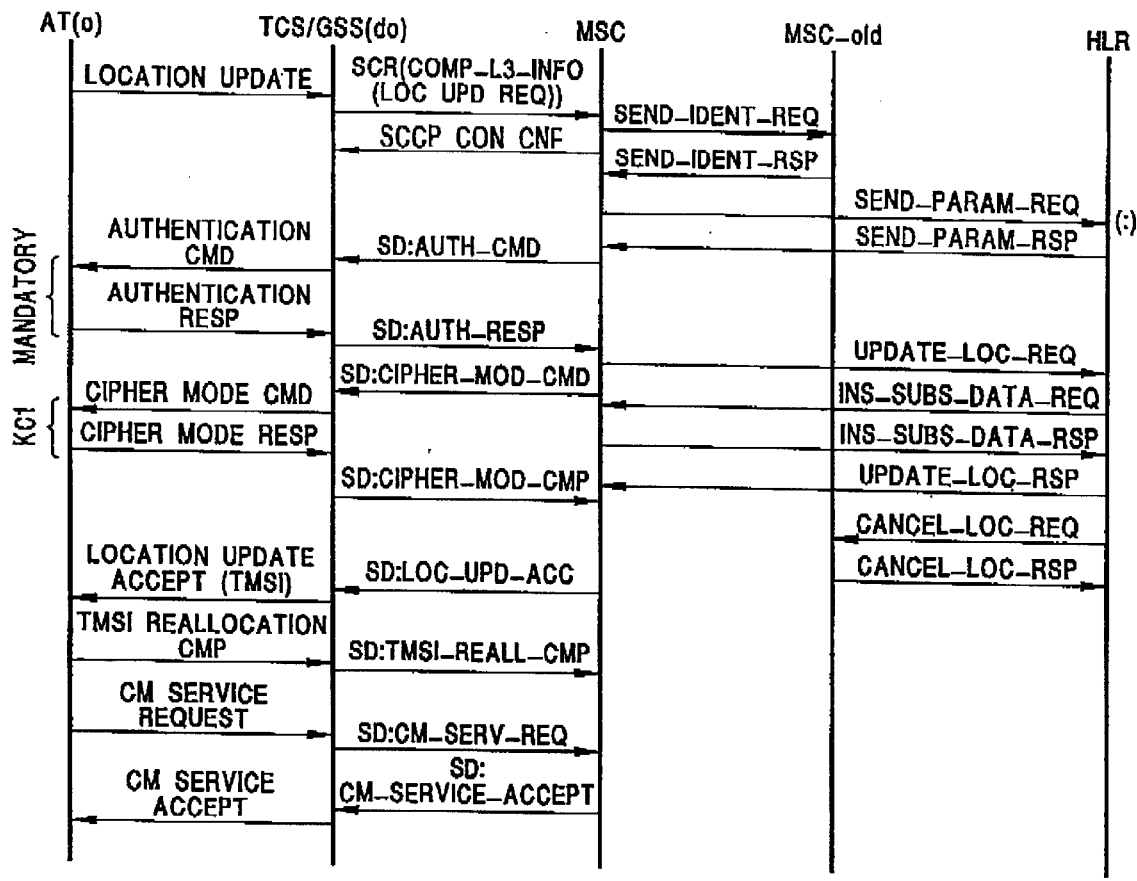
FIG. 6 describes the location update procedure for a mobile subscriber.

The following procedure and the diagram in FIG. 6 describes the location update procedure for a mobile subscriber when initiating a call to a destination that requires the mobile subscriber to be re-registered.

The AT(o) sends LOCATION UPDATE message with (FOR=True) to the MSC of the selected gateway. The MSC will initiate the Authentication Procedure by sending the AUTHENTICATION REQ message which is a DTAP message, and passes transparently via the GSS. The AT(o) responds with the Authentication Response, which again is a DTAP message, and passes transparently via the GSS to the MSC.

The MSC then initiates the Ciphering Procedure by sending a ciphering. After the procedure is completed, the GSS(d) informs the MSC about the completion of the procedure. The MSC sends the Location Update Accept (spot beam id remains unchanged, new value of TMSI and FOP=True, GSS initializes the LAC=new MSC_ID). The AT(o) updates its SIM with the new value of TMSI,LAI and responds with TMSI reallocation Complete message.

After the TMSI reallocation procedure, the MSC shall defer the link release procedures (e.g., by some time). The AT issues the CM SERV REQ message, which the GSS passes to the MSC on the same SCCP connection used for the Location Update. The MSC on receipt of the CM SERVICE REQUEST, establishes a MM connection and sends a CM SERVICE ACCEPT message to the AT(o). On the AT(o) side, an MM connection is established on receipt of the CM SERVICE ACCEPT message. Finally, the processing continues into the Call Setup procedures with the SETUP message.

Figure 7:
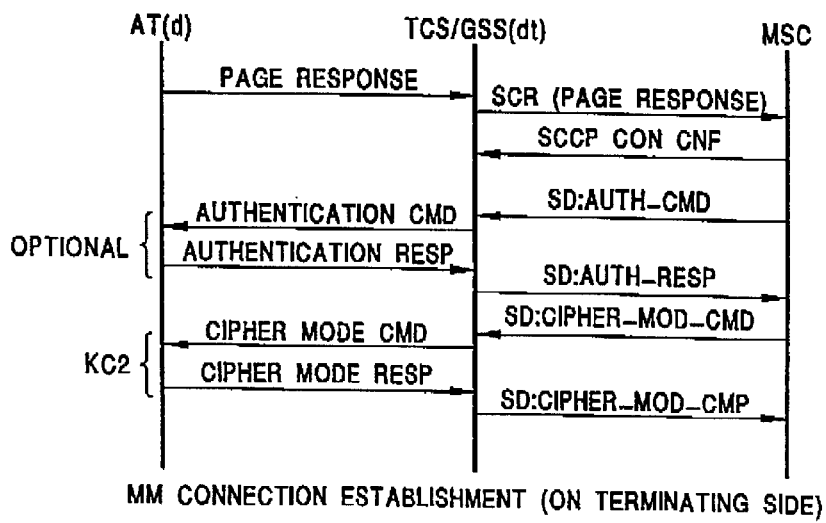
FIG. 7 shows the MM connection establishment procedure between the terminating AT and the MSC.

FIG. 7 shows the MM connection establishment procedure between the terminating AT and the MSC. This case is also similar to the originating AT procedures with the following differences. MSC initiates the authentication/ciphering process on receipt of the PAGE RESPONSE instead of Location Update. There will not be any exchange of CM SERVICE REQUEST/CM SERVICE ACCEPT message between AT(d) and the MSC. The MSC will normally not assign new TMSI to the AT(d). MSC sends the SETUP towards the terminating AT(d) and initiates the CC Connection Procedure.

Figure 8:
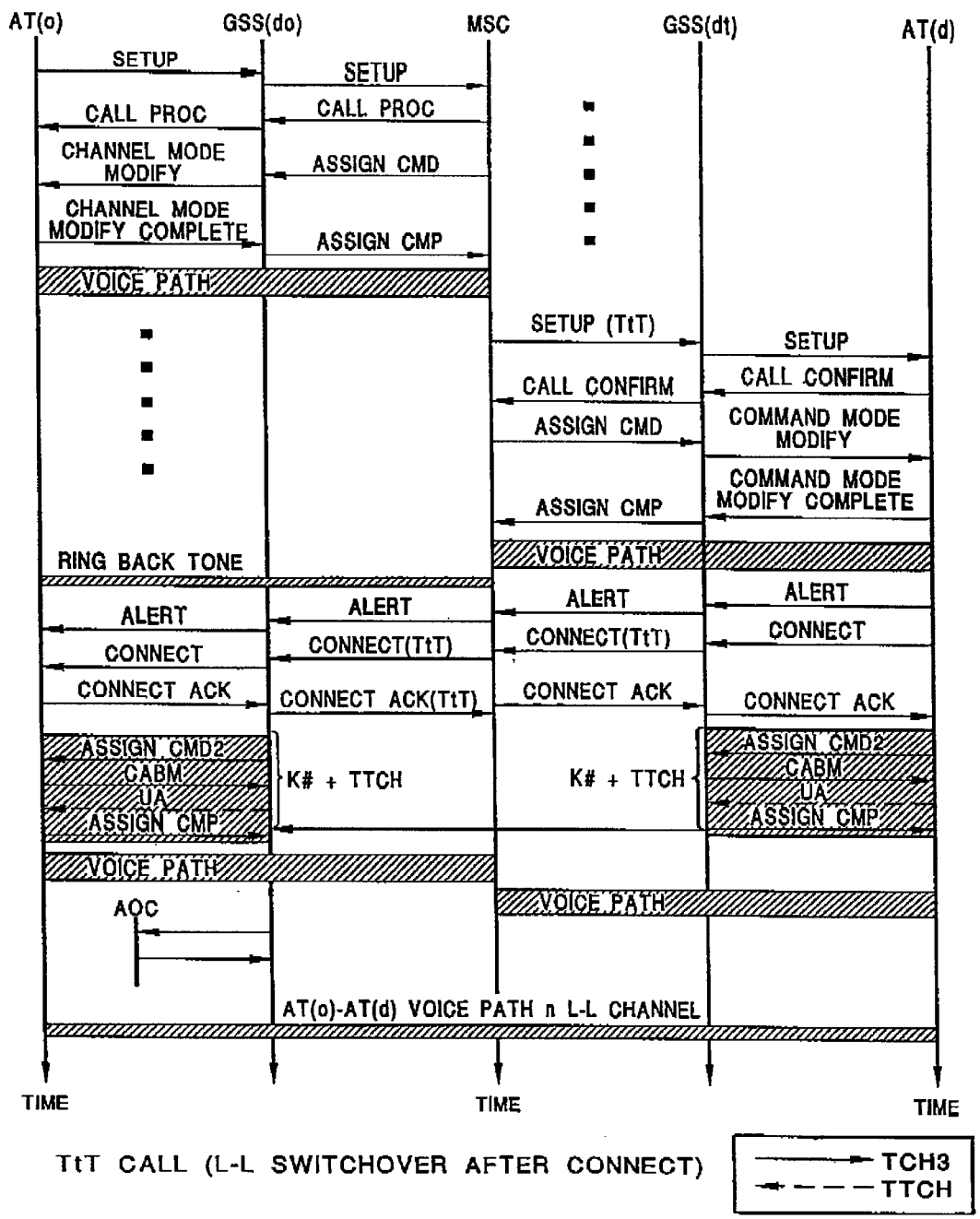
FIG. 8 illustrates a network CC connection with each AT, with a double hop voice call being established.

The objective of this procedure is to establish a single-hop voice call between two AT's. FIG. 8 illustrates a network CC connection with each AT, with a double hop voice call being established. While two AT's are engaged in the double hop voice call, the Network performs the assignment of the TTCH channel to AT's. In the assignment procedure both AT's and Network shall agree on a common ciphering Key (Ktt), and cipher synchronization for the TtT call. On successful completion of the TTCH channel assignment, the Network communicates with the AOC to cross connect the assigned L—L channels at the satellite to establish a single hop voice call.

The originating AT(o) sends a SETUP message with is interpreted by the GSS(do) associated with the originating AT. The GSS(do) inserts the TtT parameters in the SETUP message if the bearer capabilities indicates voice call. These TtT parameters include information such as: TCH slot information, ciphering key, Call id, GSS id, etc. The GSS (do) transfers the SETUP message with TtT indications to the MSC on the established SCCP connection and instructs the GSS(dt) to intercept the receive SETUP/CONNECT message on the SCCP between MSC and GSS(dt) for the same values of the TtT parameters.

On receipt of SETUP message, the MSC sends the CALL PROCEEDING to the originating AT(o) via GSS(do) which is handling the originating AT(o). The MSC issues ASSIGNMENT message to the GSS(do), performs the channel mode modify procedure, and issues CHANNEL MODE MODIFY message to the AT(o). The AT(o) performs the channel mode modify procedure and changes the mode of the channel and sends the CHANNEL MODE MODIFY ACK message to the GSS(do). The GSS(do) sends the ASSIGNMENT COMPLETE message to the MSC. Finally, the MSC performs the HLR interrogation like a normal AT terminated call. On completion of the HLR interrogation, it will send PAGING REQUEST to the terminating AT(t) via one of the GSS's, say GSS(dt), associated with the terminating AT(t). The GSS(dt) will insert the MSC_ID and sends the PAGING REQUEST message with TMSI/IMSI as mobile identity to the AT(t).

At this point, the originating AT(o) is waiting for the response from the Called Party. During the CC connection establishment on the terminating side, the MSC receives an ALERTING and CONNECT message from the terminating AT(t). On receipt of these messages, the MSC generates an ALERTING CONNECT message and transfers these messages to the GSS(do) on the established SCCP connection. The GSS(do) transfer the ALERTING and CONNECT message to the AT(o) without any additional processing. The originating AT(o) on receipt of the CONNECT message acknowledges the connection by issuing a CONNECT ACK message to the GSS(do). The GSS(do) inserts the TtT parameters in the CONNECT ACK message and transfers it to the MSC. At this point, MSC shall start to block or reject SS, SMS service request for the AT's which are engaged in the call.

The MSC transfers the SETUP (without SIGNAL IE) message to the GSS(dt) over the established SCCP connection (see FIG. 8). The GSS(dt) intercepts it, extracts the TtT parameters, and compares with the values of TtT parameters received. If both values are identical, the GSS(dt) marks the RR of the originating AT(t) as TtT type, and transfers the SETUP message on the air to the destination AT(t). It will also allocate an AT id for the call with the current TCH and TTCH if possible, or allocate a complete new combination of TCH, TTCCH, and AT id.

The AT(d) sends ALL CONFIRM MESSAGE in response to the SETUP message to the GSS(dt). the GSS(dt) transfers the received CALL CONFIRM message to the MSC on the established SCCP connection. The MSC on receipt of the CALL CONFIRM message issues ASSIGNMENT message to the GSS(dt), the GSS(dt) performs the channel mode modify procedure, and issues CHANNEL MODE MODIFY message. The terminating AT(t) changes the mode of the channel and, on completion of it, it sends the acknowledgement of it to the GSS(dt) by transferring CHANNEL MODE MODIFY ACK message to it. On receipt of the acknowledgement of CHANNEL MODE MODIFY message, the GSS(dt) sends the ASSIGNMENT COMPLETE message to the MSC.

On assignment of the traffic channel/changing mode of the channel to the AT(d), the AT(d) will generate the ringing indication to the user and sends the ALERTING message to the MSC. The MSC will forward an ALERTING message to the originating AT(o) to indicate the far end is ringing, and generates a Ring back tone on the assigned traffic channel for the originating AT(o). The terminating AT's user picks the phone (off-hook) and answers the MSC by sending a CONNECT message. On detection of off-hook condition, the AT(t) stops ringing. On receipt of the CONNECT message, the MSC stops the generation of the ring back tone, sends CONNECT ACK to the AT(t), and forwards the CONNECT message to the AT(o).

The described approach of TtT call networking assigns the TTCH channel at the time of receipt of the CONNECT message from the terminating AT(d) such that two AT's remain engaged in a double hop call for a duration of approximately 3.0 seconds. At the end of it, a single hop call is established. During this time, the network assigns the TTCH to the respective AT's, and on completion of it, the network communicates with AOC to connect assigned L—L channel at the satellite. This way the voice gets intercepts by the network due to FACCH messages of the ASSIGNMENT COMMAND2 procedure, and at the end, on completion of Switch over of L—L channel, users start to get better voice quality. The changes in the voice quality and interception of voice produces a poor quality service of voice call.

However, the service can be improved by reducing the timing window of the double hop call, and providing the TTCH channel before the Voice path is established. With this approach, the double hop call will last only for 1.0 sec, without any interception of FACCH messages of the ASSIGNMENT COMMAND2 PROCEDURE.

The objective of this procedure is to describe a CC procedure to reduce the duration of the double hop call during the TtT call. The originating AT(o) sends a SETUP message which is interpreted by the GSS(do) associated with the originating AT. The GSS(do) inserts the TtT parameters in the SETUP message if the bearer capability indicates voice call. These TtT parameters include information such as: TCH slot information, ciphering key, Call id, GSS id, etc. The GSS(do) transfers the SETUP message with TtT indications to the MSC on the established SCCP connection, and instructs the GSS(dt) to interpret the receive SETUP/CONNECT message on the SCCP between MSC and GSS (dt) for the same values of the TtT parameters.

MSC gets the SETUP, sends the CALL PROCEEDING to the originating AT(o) via GSS(do) which is handling the originating AT(o). The MSC issues ASSIGNMENT message to the GSS(do). The GSS(do) performs the channel assignment procedure by using an ASSIGNMENT COMMAND2 message. On successful completion of it, the GSS(do) sends the ASSIGNMENT COMPLETE message to the MSC. Finally, the MSC performs the HLR interrogation like a normal AT terminated call. On completion of the HLF interrogation, it will send a PAGING REQUEST to the terminating AT(t) via one of the GSS's, say GSS(dt), associated with the terminating AT(t). The GSS(dt) will insert the MSC_ID and send the PAGING REQUEST message with TMSI/IMSI as mobile identity to the AT(t).

At this point, the originating AT(o) is waiting for the response from the Called Party. During the CC connection establishment on the terminating side, the MSC receives an ALERTING and CONNECT message from the terminating AT(t). On receipt of these messages, the MSC generates an ALERTING, CONNECT message and transfers these messages to the GSS(do) on the established SCCP connection. The GSS(do) transfers the ALERTING and CONNECT messages to the AT(o) without any additional processing. Before the GSS(do) sends the CONNECT message, it initiates a cross connection of L—L at the satellite via AOC, and then it transfers the CONNECT message to AT(o). The AT(o), on receipt of the CONNECT message, acknowledges the connection by issuing a CONNECT ACK message to the GSS(do). The GSS(do) inserts the TtT parameters in the CONNECT ACK message and transfers it to the MSC. At the point MSC shall start to block or reject SS, SMS service request for the AT's which are engaged in the call.

The MSC transfers the SETUP (without SIGNAL IE) message to the GSS(dt) over the established SCCP connection. The GSS(dt) intercepts it, extracts the TtT parameters, and compares it with the values of TtT parameters received. If both values are identical, the GSS(dt) marks the RR of the originating AT(t) as TtT type and transfers the SETUP message on the air to the destination AT(t). It will also allocate a AT id for the call with the current TCH and TTCH, if possible, or allocate a complete new combination of TCH, TTCCH, and AT id.

The AT(d) sends CALL CONFIRM MESSAGE in response to the SETUP message to the GSS(dt). The GSS (dt) transfers the received CALL CONFIRM message to the MSC on the established SCCP connection. The MSC, on receipt of the CALL CONFIRM MESSAGE, issues ASSIGNMENT message to the GSS(dt). The GSS(dt) performs the channel assignment procedure by using ASSIGNMENT COMMAND2, and, on successful completion of it, the GSS(dt) sends the ASSIGNMENT COMPLETE message to the MSC. On assignment of the traffic channel, the AT(d) will generate the ringing indication to the user and send the ALERTING message to the MSC. The MSC will forward an ALERTING message to the originating AT(o) to indicate the far end is ringing, and generates a ring back tone on the assigned traffic channel for the originating AT(o). The terminating AT's user picks the phone (off-hook) and answers the MSC by sending CONNECT message. On detection of off-hook condition, the AT(t) stops ringing. On receipt of the CONNECT message, the MSC stops the generation of ring back tone, sends CONNECT ACK to the AT(t), and forwards the CONNECT message to the AT(o).

The GSS(do), on receipt of the CONNECT message, first initiates L—L connection procedure, and then transfers the CONNECT message to the AT(o). In this way, the L—L connection processing is initiated first, and then transfer of CONNECT message (double hop) by the GSS(do). The duration of the double hop call is equal to the duration time taken by the CONNECT received by the GSS(do) and to cross connect the L—L channel at the satellite.

In case the GS assigns the channel before CONNECT is received, the duration of the double hop call is 1310 msec. In other cases in which the assignment of channel is performed after the CONNECT ACK, the duration of the double hop call is 3080 msec. With this approach, the duration of the double hop call will be reduced and it will remain only for 1.3 sec instead of 3.0 sec.

Figure 9:
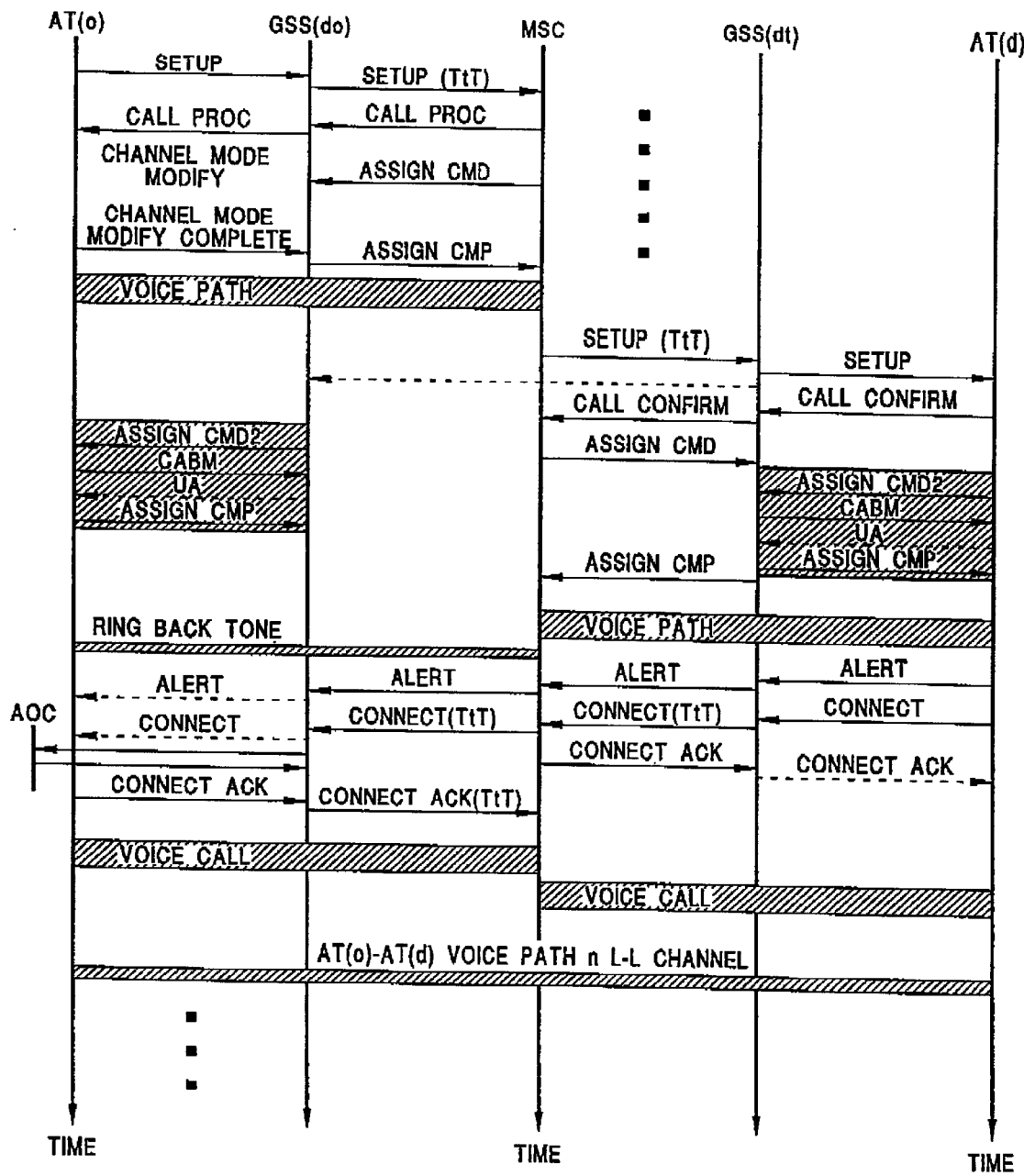
FIG. 9 shows L—L switch over after a TtT call connection.

At the end of the CC establishment procedures described, both the AT's are in communication via a double hop voice call (see FIG. 9). FIG. 9 shows L—L switch over after a TtT call connection. In the GEO network, the desired goal is to establish a single hop voice call between two AT's. To achieve this, the GS communicates with the AOC to connect the L—L channel through the satellite at the end of successful completion of the ASSIGNMENT COMMAND2 procedure.

It is clear from GSM that to cipher and decipher information, both the AT and the GTS must have a common ciphering algorithm (A5), the same ciphering Key (Kc), and be synchronized with respect to the Frame Number (FN). Before ASSIGNMENT COMMAND2 procedure, both the AT's are communicating with the MSC by using two independent ciphering keys (KC1 and KC2) and common frame number to cipher and decipher the transmitted and received message. Once AT's are switched into TtT mode, both the AT's and network enter into disharmony for the support of ciphering for the following reasons.

Each AT carries a different ciphering key, but both AT's are required to exchange information in ciphered mode. The frame number used by each AT remains unchanged but the L—L channel switching at the satellite may introduce a different frame delay in transferring the information from one slot to another. One of the AT's shall act as network, and CU of the network shall act as Terminal as far as ciphering is considered. The network shall disable the signaling/voice path from the network to AT on the forward link, as two AT's communicate directly on L—L channel. A new channel is required for the network to AT communication to perform the power, timing corrections, and upper layer signaling protocol to support the release procedure of the call.

Figure 10:
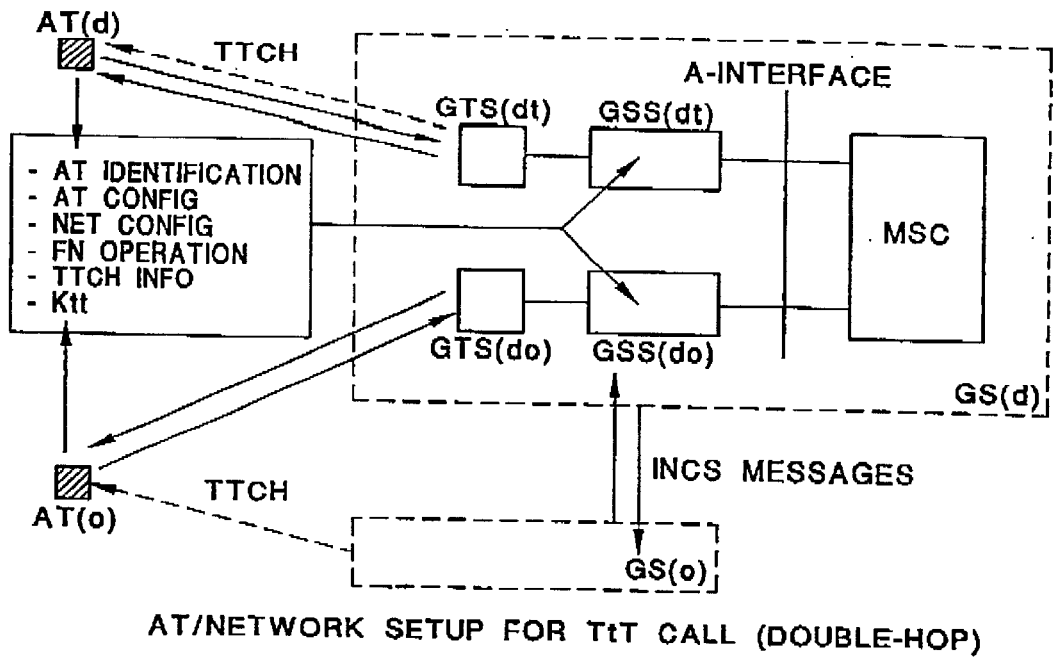
FIG. 10 illustrates AT/network setup for a double-hop call.

In order to cipher the information, it is essential that frame number, ciphering algorithm (A5), and the ciphering key must be identical to perform successful ciphering operation. In order to achieve this during TtT call network shall perform the following steps: Network shall delivery a common key (Ktt) to each AT involved in the call; Network shall also use same Ktt key to communicate with each AT; Network shall indicate to one of the ATs to act as Network in the use of S1 and S2; and Network shall indicate to each CU a corrected FN count for use in the transmission of ciphered bursts. FIG. 10 illustrates AT/network setup for a double-hop call. This information is transported by the GS by using the ASSIGNMENT COMMAND2 message and procedure (see FIG. 10). The procedure is always initiated by the GS, and at the end of the successful completion, both AT's and GS achieve synchronizations with each other.

In order to support the signaling, power control, and timing corrections, the network assigns a TTCH channel (point to multipoint) and TT_ID to each AT. The assigned AT shall listen to this channel. The communication of the AT with the network on the return link remains unchanged; that means in that direction it utilizes the L-Ku link.

Before the network initiates the assignment of the traffic channels (TTCH), common ciphering key, and other parameters, it communicates with the AOC via TCS to determine whether the satellite will be able to transfer information which it receives in its Rx slots and in its Tx slots within the same frame number or not. If not, then how many extra frames it will take to do so. Normally this delay is not more than one frame if the AT(t) receiver side is expecting the message in frame "N". Now it will be received in "N+1". On the sender side of the AT(o), since the message was ciphered by using frame number "N" but will be received in N+1 instead of "N", the receive side shall decrement its current Rx frame number by one to decipher the message. Since the same AT(t) is communicating with the network, the network shall cipher the information with the "N-1" since the AT decrements its Rx frame number to decipher the message.

Generation of the Common ciphering key (Ktt). Allocation of TT_ID and TTCH (upper layer signaling, power, timing correction). AT and CU configuration (Network or Terminal for the use of S1, S2).

The above information is given by the network to the AT's via ASSIGNMENT COMMAND2 and to the network components (CU) via internal message as described below. The GSS(dt) associated with the terminating AT(t) will assign common ciphering key (Ktt), TTCCH channel, TT_ID, AT(d) configuration and indication to decrement the Frame Number to decipher the received message via ASSIGNMENT COMMAND2. The GSS(dt) associated with the terminating AT(t) will assign common ciphering key (Ktt). Network configuration to act as network or terminal for the use of ciphering keys S1, S2 and whether to delay the transmission of message by one frame number is not via Internal messages.

The GSS(do) associated with the originating AT(o) communicates with the GS(o) to activate the TTCH channel for the given TT_ID. The AT(o) assigns a common ciphering key (Ktt), TTCH channel, TT_ID configuration (AT/NETWORK) and indication to decrement the frame number to decipher the received message via ASSIGNMENT COMMAND2. The network port assigns common ciphering key (Ktt), new channel (TCH), if required, network configuration to act as network or terminal for the use of ciphering keys S1, S2, and whether to delay the transmission of message by one frame number or not via ASSIGNMENT COMMAND2.

There are two approaches to perform this function: the first one is like GSM and the second one has some sort of deviation from the GSM. The following sections discuss both the approaches.

Figure 11:
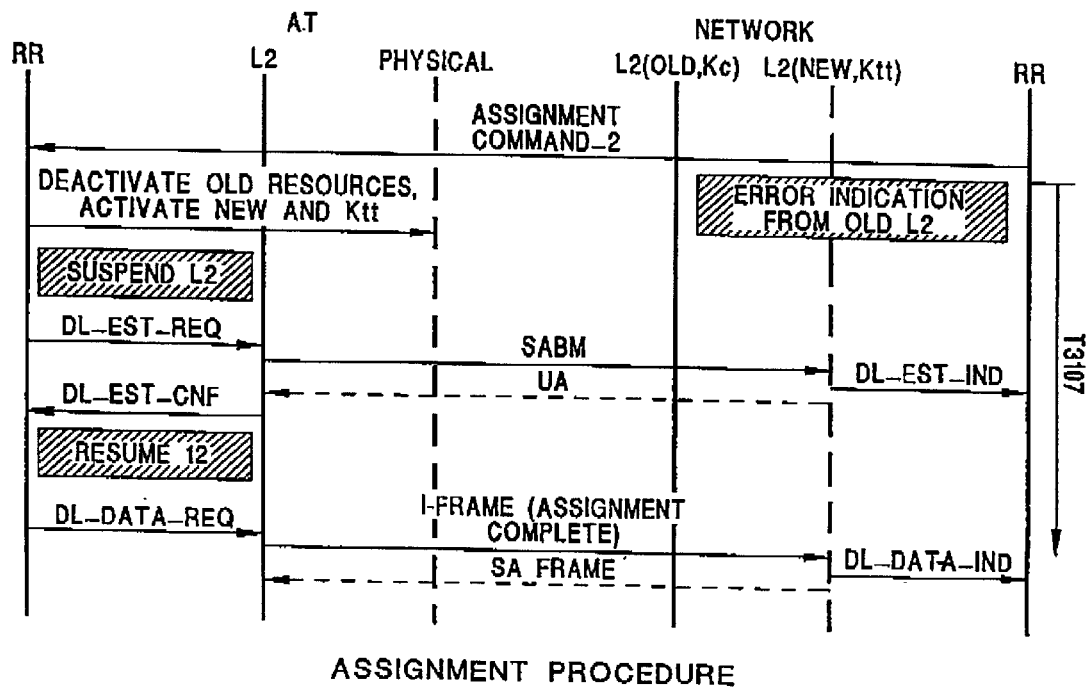
FIG. 11 illustrates the network initiating the channel assignment procedure by sending an ASSIGNMENT COMMAND2 message to the AT on the established link.

FIG. 11 illustrates the network initiating the channel assignment procedure by sending an ASSIGNMENT COMMAND2 message to the AT on the established link, and suspending the transmission of signaling messages except RR messages required to perform the procedure. The ASSIGNMENT COMMAND2 message shall contain Ktt, TTCH, AT configuration, frame number offset. On receipt of the message by the AT, it shall suspend the transmission of the signaling messages (layer 3), except for those RR messages needed for this procedure, until resumption is included. The AT initiates a local end release of link layer connections, disconnects the physical channels switching to the assigned channels, initiates ciphering with Ktt, and initiates the establishment of the link on the assigned channel. On successful completion of the link establishment, the AT shall send the ASSIGNMENT COMPLETE message to the network. At the receipt of the ASSIGNMENT COMPLETE message, the network releases the previously allocated resources.

The ASSIGNMENT COMMAND2 message contains the description of new configuration including TCH and TTCH as described below. Description of TTCH channel IE (Rf carrier, 11 bits, Rx slot# 5 bits). AT Identification IE (TT_ID=6 bits) used during call. Cipher mode setting IE, Common Ciphering Key (Ktt=64 bits). Frame number offset IE (decrement the current frame number or not=1 bit). Configuration AT or Network IE (1 bit, 0=AT and 1 network). Description of L—L channel (optional) IE (Rf carrier, 11 bits, Rx slot# 5 bits, Tx slots 5 bits). Power control and Timing correction IE (optional).

FIG. 12 shows the channel assignment procedure under abnormal cases as described below. If the ASSIGNMENT COMMAND2 message instructs the AT to use a channel description or mode that it does not support, the AT shall return an ASSIGNMENT FAILURE message with the cause channel mode unacceptable, and mobile station shall remain on the current channel. If the AT receives the ASSIGNMENT COMMAND2 message that instructs the mobile to use-a nonexisting channel or any other condition that makes these messages invalid, the AT remains in the current channel and sends to the network an ASSIGNMENT FAILURE message. On the AT side, if a lower layer failure happens on the new channel before the ASSIGNMENT COMPLETE message has been sent, the AT deactivates the new channels, reactivates the old channels, reconnects the main signaling link. It then sends an ASSIGNMENT FAILURE message, cause "protocol error unspecified" on the main signalling link and resumes the normal operation, as if no assignment attempt had occurred. The operational parameters (e.g., ciphering mode) when returning on the old channel, are those applied before the procedure.

If lower layer failure happens while attempting to connect to the old channels, the radio link failure procedure is applied as described in CAI. On the network side, if timer T3107 elapses before either the ASSIGNMENT COMPLETE message has been received on new channels, an ASSIGNMENT FAILURE message is received on the old channels, the network shall release all the context related to the new channel and continue to communicate with the AT on the old channel. In the case of GSM, both the contexts, old and new channel contexts, are released and AT may perform a call re-establishment. On the network side, lower layer failure occurring on the old channels after the sending of the ASSIGNMENT COMMAND2 message are ignored. Lower layer failure occurring after the receipt of the SABM frame on the new link are treated following the general rules as defined in CAI.

In this procedure, the transmitter transmits each message with (key_indication_flag) to indicate the receiver, which key has been used to cipher the message. The receiver checks the key_indication_flag for each message and deciphers the message by using the appropriate key. On the transmission side, the RR layer transfers the key to physical layer (Firmware). The transmission side of the physical layer indicates to the peer physical layer which key (Ktt/Kc) shall be used to decipher the message. On the receive side, the receiver checks key_indication_flag, selects the key to decipher the message, and forward the message to the appropriate data link layer. With this approach, network need not keep the old radio resources until (3–5 seconds) new link is established.

FIGS. 13 and 14 show the configuration of the AT's and GS engaged in a TtT double hop call. At this time, before the switch over, the GS listens and transmits on the L-Ku band. On completion of the assignment of the channels, the GSS(d) communicates with the AOC via TCS to switch the L—L channel at the satellite. Before switching of the L—L channels, the two AT's remain in communication with each other via a double hop call.

If the GS receives a positive response of the L—L connection from the AOC via TCS, both the GSS(do) and GSS(dt) shall initiate to disable the Tx port in the network, hence the network will listen only to the call on the L-Ku link (see FIG. 14). If the GS receives a negative response of the L—L connection from the AOC via TCS, both the GSS(do) and GSS(dt) shall de-assign TTCH so that the call can be continued as a double hop call (via L-Ku) and SS and SMS can be supported.

Figure 15:
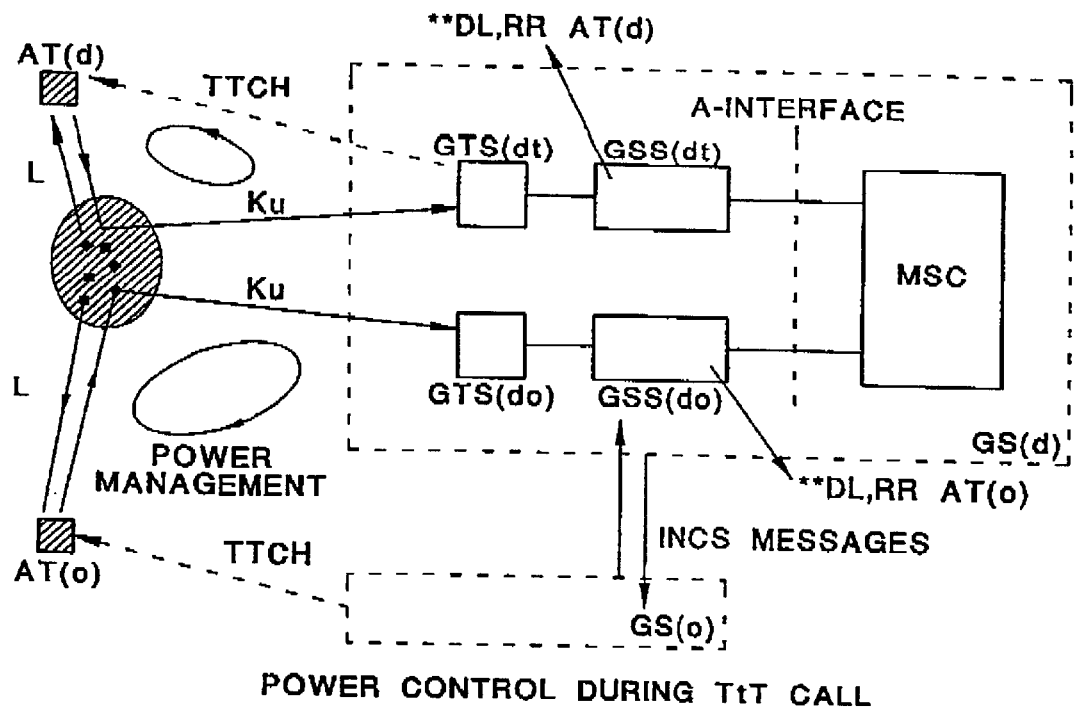
FIGS. 15 and 16 show the configuration and power control of a TtT call in the GEM in which both the AT's are registered.
Figure 16:
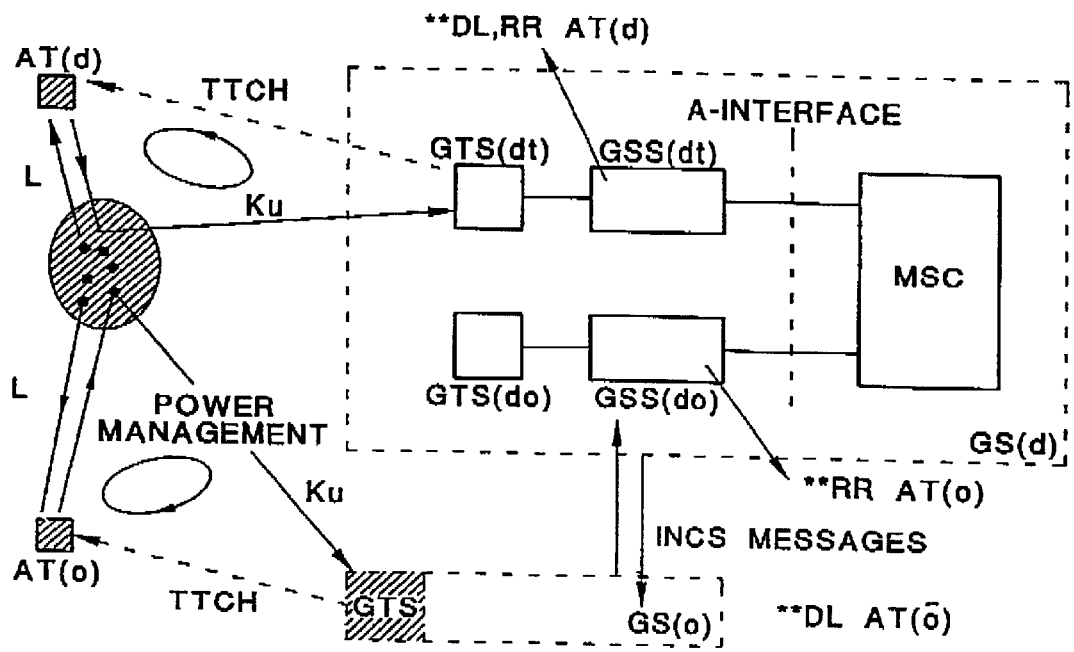

FIGS. 15 and 16 show the configuration and power control of a TtT call in the GEM in which both the AT's are registered in a GS(d), and The Data Link layer, RR protocol peers for both AT's are located in the GSS(d), GSS(dt) associated with the MSC involved in the call. The power control and timing corrections are carried by two layers, physical and the RR layer message between AT and the network.

In the GEM network two different types of channels are used to convey the power control information via physical layer. The power correction information for AT(o) and AT(d) is carried by the status field (4 bits) of the NT3 burst, in the direction of return link. In the direction of forward link, Terminal-to-Terminal Status Field Channel (TSFCH) is used to provide power control from the GS(d) to an AT(o) and AT(d). The INCS connections between two GS(d), GS(o) are used to transfer power control correction information for the AT(o) from the GS(do).

At the end of L—L connection, the originating AT(o) communicates with GS(d) via INCS on forward link. The messages the AT(o) receives from the network are power control and other layer 3 messages. It seems to me for power control, it is a long path and much more time consuming. The timing for the power control messages from the network to the AT(o) can be reduced by establishing a communication between AT(o) and GS(o). At this point, the GS(d) RR layer shall request GS(o) to send SABM on TTCH and expects UA on the Ku via GS(o) channel unit. On successful completion of it, the AT(o) communicates with GS(o) on this established link, and power control information will be provided by the GS(o) instead of GS(d) (see FIG. 16), but it will be on the price of call interception.

It has been decided to have a RR layer FACCH message. There will not be any timing correction at the physical layer.

The implementation of Supplementary Services in the APMT System will be affected by the TtT calls connected single-hop. In this case, the Supplementary Services will not be available and therefore must be prevented. For an AT engaged in a AT—AT call via a single-hop L—L connection, the HOLD, Call Waiting, and Multi-Party services shall be blocked by the MSC. The non-call related SS Services can be supported by the GEM CAI procedure, if security is not required.

The implementation of SMS Services in the APMT System may be affected by the TtT calls connected single-hop. In this case, the SMS Services will not be available and therefore must be prevented. For an AT engaged in a AT—AT call via a single-hop L—L connection, the SMS point-to-point services (AT originated or terminated) shall be blocked by the MSC. The services can be supported by the GEM CAI procedure, if security is not required.

It should be appreciated that a wide range of changes and modifications may be made to the preferred embodiments as described herein. Thus, it is intended that the foregoing detailed description be regarded as illustrative rather than limiting and that the following claims, including all equivalents, are intended to define the scope of the invention.

What is claimed is:

1. A system for implementing single hop space segment terminal to terminal connections, the system comprising:
   a satellite-based radio frequency communication link for conveying multiple communication channels over the space segment via one or more spot beams;
   a terrestrial supervisory transceiver in communication with said satellite-based communication link;
   a first access terminal within said one or more spot beams;
   a second access terminal within said one or more spot beams;
   a switch for said multiple communication channels for coupling said first access terminal and said second access terminal over the space segment via said one or more spot beams, said terrestrial supervisory transceiver being in communication with said switch via said satellite-based communication link for implementing the single hop space segment terminal to terminal connection; and
   signaling channels conveyed by the satellite-based radio frequency communication link and established between all of the terrestrial supervisory transceiver, the first access terminal and the second access terminal, wherein the signaling channels exist during the single hop terminal to terminal connection.

2. The system of claim 1 wherein said switch and said satellite-based radio frequency communication link are a geosynchronous earth orbit satellite.

3. The system of claim 1 wherein said terrestrial supervisory transceiver comprises a gateway station.

4. The system of claim 3 wherein said gateway station synchronizes said first access terminal and said second access terminal for maintaining network control, ciphering and signaling.

5. The system of claim 3 wherein ciphering is synchronized between the gateway station, the first access terminal and the second access terminal.

6. The system of claim 5 wherein the gateway station assigns a common ciphering key to the first access terminal and the second access terminal.

7. The system of claim 1 wherein the signaling channels comprise bidirectional signaling channels.

8. The system of claim 1 wherein the terrestrial supervisory transceiver being in communication with said switch via said satellite-based communication link for implementing a double hop space segment connection in the event of a failure of the single hop space segment terminal to terminal connection.

9. A method for implementing single hop space segment terminal to terminal connections, the method comprising the steps of:

providing a satellite-based radio frequency communication link for conveying multiple communication channels over the space segment via one or more spot beams;

supervising satellite based communications with a gateway station in communication with the satellite-based radio frequency communication link;

receiving communications originated by a first access terminal within the one or more spot beams, the destination of the telephone call being directed to a second access terminal;

determining that the second access terminal is within the one or more spot beams;

switching the multiple communication channels for coupling the first access terminal and the second access terminal over the space segment via the one or more spot beams with supervisory transactions being communicated between the space segment to the gateway station for implementing the single hop space segment terminal to terminal connection;

assigning respective signaling channels conveyed by the satellite-based radio frequency communication link and established between all of the gateway station, the first access terminal and the second access terminal, wherein the respective signaling channels are for use during the single hop space segment terminal to terminal connection.

10. The method of claim 9 wherein said satellite-based radio frequency communication link providing step comprises the step of providing a geosynchronous earth orbit satellite for establishing connections between the first access terminal and the second access terminal.

11. The method of claim 9 comprising the step of synchronizing the first access terminal and the second access terminal for maintaining network control, ciphering and signaling with the gateway station.

12. The method of claim 9 wherein the assigning step comprises assigning the respective signaling channels for power control, timing correction and legal interception of the telephone call.

13. The method of claim 9 further comprising synchronizing ciphering between the gateway station, the first access terminal and the second access terminal.

14. The method of claim 13 further comprising assigning a common ciphering key to the first access terminal and the second access terminal.

15. The method of claim 9 wherein the respective signaling channels comprise bidirectional signaling channels.

16. The method of claim 9 further comprising detecting a failure in the single hop space segment terminal to terminal connection.

17. The method of claim 9 further comprising switching, in the event of a failure of the single hop space segment terminal to terminal connection, the multiple communications channels for coupling the first access terminal and the second access terminal to a double hop space segment connection between the first access terminal and the second access terminal via the gateway station.

18. A satellite-based radio frequency communication link for conveying communication channels over a space segment via one or more spot beams, the communication link comprising:

a satellite comprising a telecommunication switch for switching the multiple communication channels to couple a first access terminal and a second access terminal over the space segment via the one or more spot beams;

a terrestrial supervisory transceiver in communication with the satellite telecommunications switch for establishing the satellite-based communication link;

said terrestrial supervisory transceiver being in communication with said telecommunications switch via said satellite for implementing single hop space segment terminal to terminal communications with a connection between the first access terminal and the second access terminal; and respective signaling channels conveyed by the satellite-based radio frequency communication link and established between all of the terrestrial supervisory transceiver, the first access terminal and the second access terminal.

19. The communication link of claim 18 wherein said terrestrial supervisory transceiver comprises a gateway station.

20. The communication link of claim 18 wherein said gateway station is in communication with said telecommunication switch to synchronize the first access terminal and the second access terminal for maintaining network control, ciphering and signaling.

* * * * *